United States Patent [19]

Ingram

[11] 4,132,335

[45] Jan. 2, 1979

[54] SLIDABLE BRACKET FOR ARTICLE CARRIER

[75] Inventor: Charles E. Ingram, Warren, Mich.

[73] Assignee: Four Star Corporation, Troy, Mich.

[21] Appl. No.: 836,966

[22] Filed: Sep. 27, 1977

[51] Int. Cl.² .............................................. B60R 7/00
[52] U.S. Cl. ........................... 224/42.1 F; 280/179 A; 105/482; 403/331
[58] Field of Search .................. 224/42.1 F, 42.1 G, 224/42.1 D, 42.1 E, 29 R; 280/179 A, 179 R; 105/482, 464, 463, 360 C, 473, 494; 403/331, 381, 316, 317; 296/36

[56] References Cited

U.S. PATENT DOCUMENTS

| 2,336,044 | 12/1943 | Stuart | 403/331 |
| 2,743,684 | 5/1956 | Elsner | 105/482 |
| 3,212,457 | 10/1965 | Looker | 105/482 |
| 3,519,180 | 7/1970 | Bott | 224/42.1 E |
| 3,605,637 | 9/1971 | Prete, Jr. | 105/482 |
| 4,015,760 | 4/1977 | Bott | 224/42.1 D |

FOREIGN PATENT DOCUMENTS

2309373 12/1976 France ................. 224/42.1 E

Primary Examiner—Duane A. Reger
Assistant Examiner—Kenneth W. Noland
Attorney, Agent, or Firm—Basile and Weintraub

[57] ABSTRACT

A bracket for association with an article carrier, such as a luggage carrier is adapted for sliding adjustment or positioning in a carrier track. The bracket includes a locking mechanism for locking the bracket anywhere along the length of the track. The bracket further includes suitable openings which receive tie-down straps or the like. The bracket is, also, contemplated as including suitable projections for detachably mounting a luggage rack and cross-strap thereto.

19 Claims, 10 Drawing Figures

Fig-10

SLIDABLE BRACKET FOR ARTICLE CARRIER

BACKGROUND OF THE INVENTION

1. Field of the Invention

The present invention pertains to adjustable brackets for article carriers. More particularly, the present invention pertains to adjustably positionable brackets for vehicle-related article carriers. Even more particularly, the present invention concerns adjustably positionable brackets for vehicle-associated luggage racks, ski racks or other article carriers.

2. Prior Art

The utilization and deployment of vehicle-related article carriers, such as luggage racks, ski racks, bicycle carriers and the like is, of course, well-documented. Furthermore, the fundamental definition of an automotive vehicle as a mode for transporting articles dictates the adoption of such articles. As legislation is enacted which necessitates a reduction in size of vehicles, the adoption of such article carriers will, undoubtedly, proliferate. The public will look to externally mounted devices for increasing the article transport capability of a vehicle. In order to be fully functional, such devices must be able to accomodate varying size loads from elongated articles, such as skis, to small axle distance bicycles.

Heretofore, the prior art has provided devices for facilitating the transporting of articles by mounting such devices to the external body of the vehicle. Thus, the art has taught fixed vehicle trunk deck and roof associated article carriers of the type under consideration herein. Usually, such devices contemplate utilizing straps or the like to tie-down the article to be transported. The ends of the straps are, ordinarily, secured to fixed postition brackets. Thus, in order to vary the types of loads to be transported varying lengths of straps must be utilized. This creates an inordinately cumbersome situation. Futhermore, such fixed brackets fail, by their very definition, to accomodate adustably positionable cross-straps, of the type ordinarily associated with luggage racks, and their attendant advantages.

It is to be appreciated that there exists within the relevant art the need for an adjustably positionable tie-down bracket, as well as article carriers which incorporate such brackets. It will be appreciated from the ensuing that the present invention achieves the desired result.

STATEMENT OF RELEVANT ART

To the best of applicant's knowledge, the following is believed to be the prior art most closely related to the present invention:

U.S. Pat. Nos.
3,677,451
3,375,365
3,165,353
3,064,868
2,988,253
2,783,367
3,828,993
2,753,095
3,902,641
2,914,231
2,628,123
2,499,136
3,719,313
3,468,460

SUMMARY OF THE INVENTION

In accordance with the present invention, there is provided an adjustably positionable bracket for an article carrier. The bracket hereof, generally, comprises:

(a) means for variably, adjustably positioning the bracket along a track provided in an article carrier, (b) an upper section interconnected to the positioning means, the upper section comprising means for receiving the ends of a tie-down strap or similar device for securing an article to the bracket, the upper section, optionally, incorporating means for detachably securing a cross-strap thereto, and (c) means for locking the bracket in position.

As contemplated by the practice of the present invention, the bracket hereof comprises a slide plate or base adapted to be slidingly disposed in a track or channel formed in the article carrier. The upper section includes an opening through which is laced a tie-down strap or the like. In an alternate embodiment of the present invention, the upper section incorporates a projection to which is detachably mounted a cross-strap. In a further embodiment of the present invention, the upper section comprises the opening as well as the cross-strap mounting projection.

The locking means hereof includes a wedge which is threadably secured to a rotatable dial or disc and which extends through the positioning means. As the dial is rotated in a first direction, a wedge is urged into engagement with the base of the track to lock the bracket in position. Rotation of the dial in the counter direction disengages the wedge from the track base to permit movement of the bracket. In an alternate embodiment, the locking means comprises a wedge and means for urging the wedge into engagement with the base against the normal bias thereof.

In a preferred embodiment of the present invention the bracket hereof is slidably mounted in a vehicle mounted article carrier slat having a track or channel formed therein.

For a more complete understanding of the present invention reference is made to the following detailed description and accompanying drawing. In the drawing, like reference characters refer to like parts throughout the several views, in which:

DESCRIPTION OF THE PREFERRED EMBODIMENTS

Now, and with reference to the drawing, there is depicted therein a bracket in accordance with the present invention as well as an article carrier incorporating the bracket hereof. The bracket hereof, generally, comprises an adjustably positionable bracket, which includes:

(a) a base for variably adjustably positioning the bracket along the extent of an article carrier, (b) an upper section interconnected to the base, the upper section comprising means for receiving an article retainer, and (c) means for releasably locking the bracket in position.

The present invention further contemplates the inclusion therewith of means for detachably mounting an article carrier cross-strap thereto.

Furthermore, and at the outset, it should be noted that, as used herein and in the appended claims, the term "article carrier" contemplates a luggage rack, ski rack or similar type of vehicle-related or associated device. As is known to the skilled artisan, such devices, ordinarily, contemplate a plurality of spaced apart slats which support a load or article disposed thereon. Such devices, also, adopt and incorporate side rails, and stationary and/or movable cross-straps where appropriate. If required, stanchions are utilized to support the side rails and stationary cross-straps. The article carriers are, usually, mounted to either the vehicle roof or trunk lid or deck. In the practice hereof, it is to be understood that the present invention is applicable to all such article carriers so long as the carrier, per se, can receive the bracket as is detailed subsequently.

Referring, now, to the drawing and in particular FIGS. 1-4, there is depicted therein a first embodiment of the present invention. In accordance herewith, there is provided a vehicle body section 10 having an article carrier 12 disposed and affixed thereon. The article carrier depicted in the drawing comprises a plurality of slats 4. The slats 14 are longitudinally extending members which are affixed to the vehicle body by any suitable mode, such as threaded fasteners (not shown) or the like.

Figure 1:
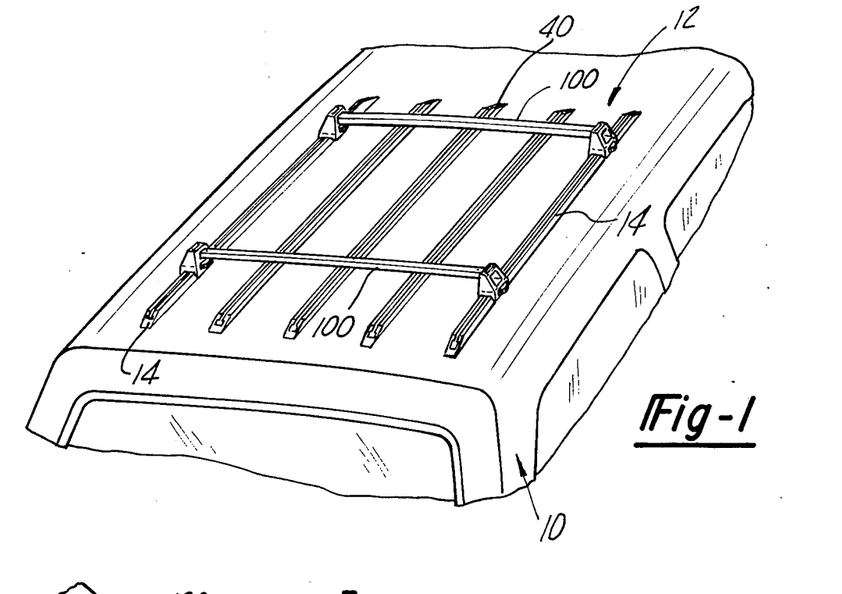
FIG. 1 is a broken, perspective view of a vehicular associated article carrier incorporating a first embodiment of a article carrier and bracket in accordance with the present invention.

As defined by the present invention, the article carrier 12 comprises at least one slat 14 affixed to the vehicle and adapted to receive a tie-down bracket 16 in accordance with the present invention. The slat 14 contemplated for use herein, generally, comprises a solid-bodied member 18 having a substantially planar lower surface 20. The surface 20 is designed to be contiguous with the vehicle body when affixed thereto. The upper surface 22 of the slat 14 is provided with bracket-receiving means 24. The bracket receiving means 24 comprises a channel 26. The channel or track 26 includes a longitudinal slot 28 formed substantially along the extent of the upper surface and is formed downwardly therefrom. The slot 28 is in registry with and opens up into an enlarged guidepath 30. The guidepath is coextensive with the slot 28. The guidepath 30 includes a bottom wall 32 which defines a seat for the bracket 16 in a manner to be described subsequently. The junction between the slot 28 and the guidepath 30 is defined by a pair of opposed inwardly directed shoulders 34, 36, respectively. As will subsequently be described, the wall 32 and the shoulders 34, 36 cooperate to retain the bracket 16 in fixed position when the bracket is placed in a locked position.

It should be noted that the slat 14 can comprise, alternatively, a formed sheet metal member, a solid or hollow interior extrusion or the like, as desired. The criticality to be attached to the slat is that it be provided with the longitudinally extending channel 26. Also, the slat 14, further, comprises means for limiting the longitudinal movement of the bracket 16 in the track 26. For example, the limiting or stop means can comprise an end cap 40 journalled onto one end of the slat 14. Alternatively, an obstruction such as an oval head screw 42 can be disposed in the channel 26, as shown. The obstruction disrupts the path of travel of the bracket to prevent passage therepast.

As heretofore noted, the slat 14 receives the bracket 16. The bracket 16 comprises (a) a base section 44 engagable with the slat and justably positioning the bracket along the extent of the track 26, (b) an upper section 46 integral with the base, the upper section for facilitating securement of articles carried on the carrier, the upper section including means for receiving an article retainer, generally, denoted at 48, and (c) means for releasably locking the bracket in position along the length of the track 26 formed in the slat, the means for releasably locking comprising a member which is urgeable into engagement with a base formed in the track. The bracket 16 hereof may, also, comprise means 52 for detachably mounting an article carrier cross-strap 54 thereto.

With more particularity, the base section 44 is slidably movable in the track 26. Thus, the base section is configured analogously to the track 26. The base section includes a lower body 56 analogously configured to, but being dimensionally slightly less than that of the guidepath 30. This dimensioning enables the lower body 56 to be slid, with facility, along the length of the guidepath.

A shank 58 projects upwardly from the lower body 56 and is integrally formed therewith. The shank 58 s disposed substantially perpendicular to the lower body and centrally thereof. The shank 58 is coextensive with the lower section along the longitudinal extent thereof. The shank 58 has a width slightly less than that of the slot 28 and projects thereabove, as shown.

It is to be appreciated that the base defines means for variable adjustably positioning the bracket, per se, along the extent of the track.

The upper section 46 is integrally formed with the base section 44 and is united therewith at the junction of the shank 58 with the lower end of the upper section 46. The upper section is substantially equal in length to the base. As shown in the drawing, the upper section has an irregular configuration and comprises means, generally, denoted at 48 for receiving an article retainer.

More specifically, the upper section includes a lower end 60. The lower end 60 is configured analogously to that of the upper surface of the slat 14. This is done for better load bearing distribution over the entire width of the slat. Upstanding from the lower end are a pair of opposed, side walls 62, 64, respectively, and a pair of opposed end walls 66, 68, respectively. The side walls and end walls are integrally formed to define a unitary structure for the upper section. A top wall 70 encloses the structure.

Figures 2, 3:
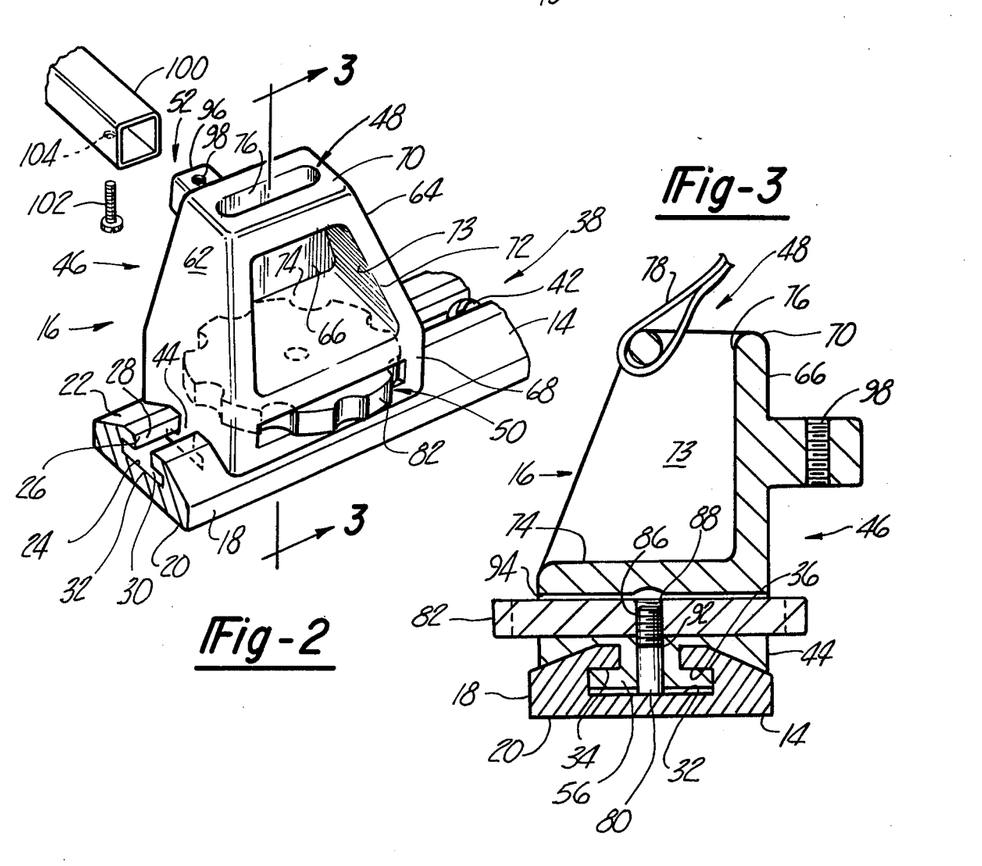
FIG. 2 is an exploded, perspective view of the first embodiment bracket of the present invention.
FIG. 3 is a cross-sectional view taken along line 3—3 of FIG. 2.

As clearly shown in FIGS. 2 and 3, the end wall 68 has a frontal opening 72 formed therein which opens into communication with the interior 73 of the upper section. A ledge 74 extends between the end walls and is disposed parallel to the top wall 73 of the upper section for purposes of facilitating handling of an article retainer.

The means 48 comprises an opening 76 formed in the top wall 70. The opening 76 is an elongated slot or the like which registers with the interior 73 of the upper section 46. An article retainer, such as a tie-down strap 78 is insertable through the opening 76 and foldable back upon itself through the opening 2, as shown.

Thus, it is to be perceived that an article, such as a bicycle, luggage or the like is placed upon the carrier 12. The article is tied down with the straps 78 which are threaded through the openings provided in the brackets 16. The brackets 16 are adjustably positionable by sliding same in the tracks formed in the slats.

Referring, again, to the drawing, as heretofore noted, in order to set the bracket in any position along the length of the associated track, the present invention further comprises means 50 for releasably locking the bracket 16 in position. The locking means 50, generally, comprises a locking wedge 80 and a rotatable disc 82 threadably interconnected to the wedge.

The wedge 80 is defined by a solid body 84 and a shaft 86. The shaft 86 has a threaded profile formed about the periphery thereof. The shaft 86 is integrally formed with the solid body 84 and projects outwardly therefrom.

The disc 82 has a central opening 88 formed therethrough. The internal periphery of the disc about the opening is provided with a threaded profile. The threaded profile of the shaft is complementary to that of the periphery about the opening. Furthermore, the diameter of the opening is substantially equal to that of the shaft 86. Thus, the shaft and the opening cooperates to define means for threadably interconnecting the disc and the wedge.

Figures 4, 5, 6, 7, 8:
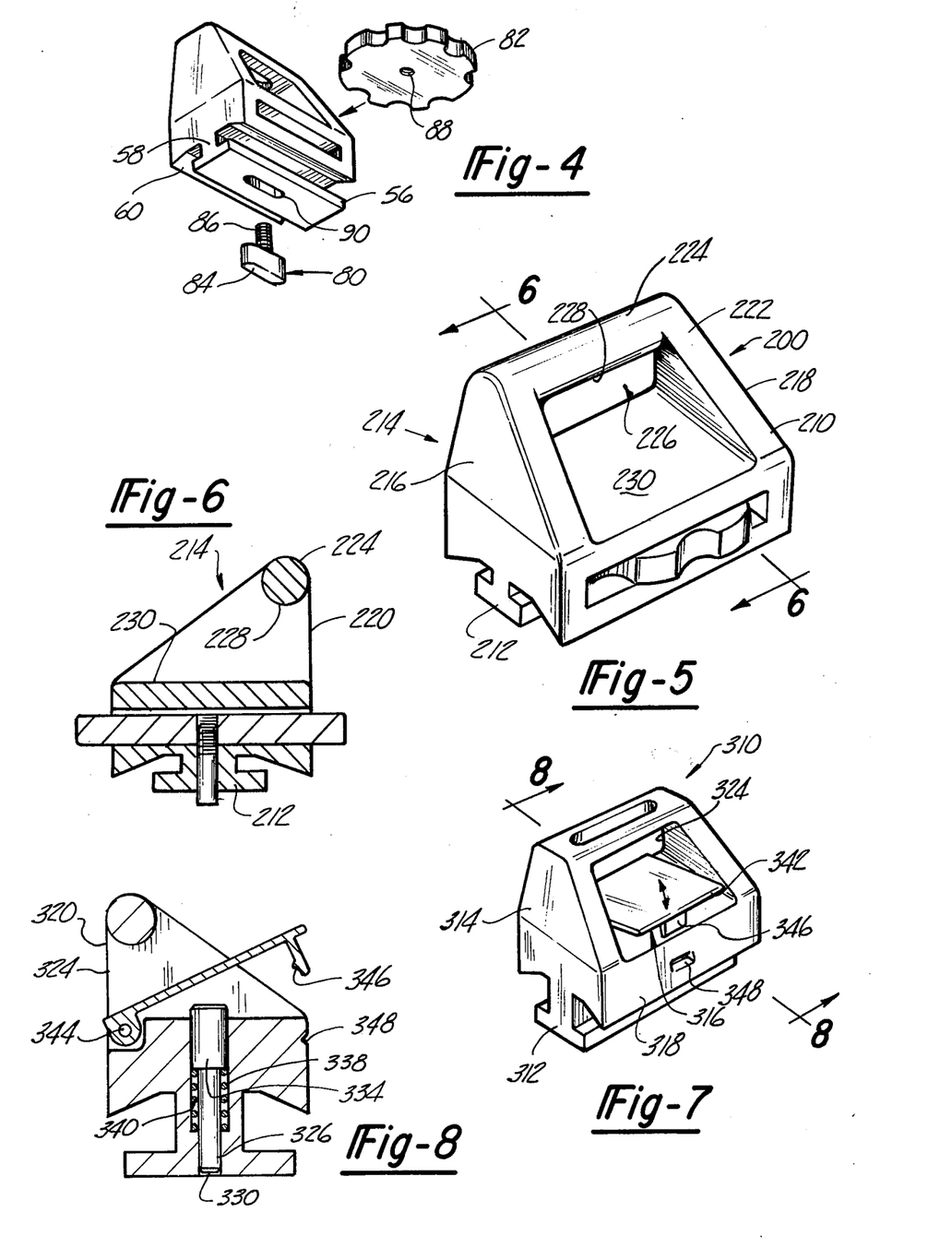
FIG. 4 is an exploded, perspective view of the first embodiment bracket hereof as seen from the underside thereof.
FIG. 5 is a perspective view of an alternate embodiment of the present invention.
FIG. 6 is a cross-sectional view taken along line 6—6 of FIG. 5.
FIG. 7 is a perspective view of a further embodiment of the present invention.
FIG. 8 is a cross-sectional view taken along line 8—8 of FIG. 7.

In mounting the locking means a pair of registering openings are utilized. As shown in FIGS. 3 and 4, the lower body 56 has an upwardly directed keyway 90 formed therein. The keyway has a height substantially equal to that of the body 84 to enable the body to nest therewithin. The shank 58 is provided with a bore 92 through which the shaft 86 projects. The bore 92 is in registry with a slot 94 formed in the upper section 46, preferably, below the ledge. The slot accomodates the rotatable disc therewithin. The periphery of the disc projects laterally beyond the end walls 66, 68 as shown to facilitate manual rotation of the disc.

It is to be appreciated that the locking means is mounted by inserting the wedge into the keyway and the disc into the plot, aligning the shaft with the disc opening and, threadably, interconnecting the disc and the shaft.

The locking mechanism functions by emplacing the bracket in the track and sliding same to the desired position. Thereafter, the disc is rotated in a first direction. Rotation of the disc urges the wedge downwardly into engagement with a base, such as the bottom wall 32 of the track guidepath 30. This wedges and locks the lower body between the bottom wall 32 and the opposed shoulders 34, 36. Rotation of the disc in the opposite direction withdraws the wedge into the keyway, thereby releasing the wedge from engagement with the bottom wall 32. Thus, the bracket is free to be slid in the track.

Referring, again, to the drawing and in particular, FIGS. 2 and 3, it will be noted that the end wall 66 is a solid wall extending from the lower section to the top wall. Projecting laterally outwardly therefrom and substantially perpendicular thereto is a cross-strap mounting member 96. The mounting member 96 has a threaded throughbore 98 formed therethrough. The member 96 is dimensioned and configured to receive an end of a cross-strap 100 thereon. A fastener, such as a bolt 102 threadably interconnects the cross-strap 100 to the bracket 16 via an opening 104 formed in the cross-strap and which registers with the throughbore 98. Thus, and in accordance with the embodiment of the invention, the bracket, also, defines means for positioning a cross-strap for a luggage rack or similar article carrier.

Referring, now, to FIGS. 5 and 6, there is depicted therein an alternate embodiment of the present invention, generally, denoted at 200. In accordance herewith, the main body of the bracket 210 comprises a base or base section 212 similar to that heretofore described and an upper section 214. The upper section 214 comprises opposed side walls 216, 218 and opposed end walls 220, 222, respectively which cooperate to define a unitary upper section integral with the lower section. A top wall 224 unites the upper section structure. As contemplated in this embodiment of the present invention, each of the end walls 220 and 222 is provided with an opening 226, 228, respectively. The openings are in registry and in communication with the interior of the upper section. A ledge 230 extends between the end walls. The openings 226, 228 and the interior 230 define a passageway through the upper section. This passageway defines the means for receiving an article retainer. This embodiment of the invention eliminates the cross-strap mounting member thereby alleviating the need for an opening being provided in the top wall since both end walls have the openings provided therethrough. In all other respects, this embodiment of the invention is the same as that shown in FIGS. 1-4 hereof.

In FIGS. 7 and 8 hereof, there is depicted a further embodiment of the present invention, generally, denoted at 310. This embodiment of the present invention comprises a main body member 310 comprising a base section 312 and an upper section 314 having means for receiving an article retainer integrally formed therewith. The bracket 310 further comprises means for releasably locking the bracket in position and indicated, generally, at 316.

The base section 312 is structured as heretofore defined. The upper section can incorporate either of the configurations heretofore defined with respect to the article retainer receiving means with or without the cross-strap mounting member. In the embodiment depicted in FIGS. 7 and 8, the end walls 318 and 320 have openings 322, 324, respectively, formed therethrough. Thus, in FIGS. 7 and 8 the upper section structure of FIGS. 5 and 6 is depicted for illustrative purposes. This embodiment of the invention adopts and incorporates a locking means different from that heretofore described.

In accordance herewith, the locking means comprises a biassed wedge 326 and means 328 for urging the wedge into engagement with the base or bottom wall of a slat track to lock the bracket in position. More particularly, the wedge 326 comprises a solid body 330. The solid body 330 is disposed in an opening or bore 332 formed in the base section 312 and projects therethrough. The body 330 has an expanded or enlarged diameter section 334 integrally formed therewith and which projects upwardly therefrom through the upper section 314. An opening 336 is formed in the ledge 338 an through which the large diameter section 334 normally projects. The section 334 projects through a bore 339 formed in the upper section and in registry with the opening 336. A biassing means, such as a coil spring 340 is disposed in the bore 332 about the section 330.

As shown in FIG. 8, the biassing means acts between the shoulder or rim of the base of the enlarged diameter section and the annular shoulder 341 formed at the base of the bore 332. Thus, the spring 340 normally biasses or urges the section 334 upwardly and, thus, the wedge upwardly through the opening 336. Thus, the wedge is normally urged out of locking engagement.

A clasp 342 is hingedly connected to upper section 314. Preferably, the clasp has one edge or end thereof hingedly connected to the upper section at the junction of the ledge 338 with the lower edge of the end wall 320 at the opening 324 thereof, as shown. Any suitable mode of hinged interconnection, such as a pivot pin 344 can be utilized. The hinge enables the clasp to be rotated about a horizontal axis, as shown.

As the clasp is rotated downwardly, it encounters the upper end of the section 334 projecting through the opening 336. Further downward rotation urges the section and, thus, the wedge against the normal bias. The urging projects and thrusts the wedge downwardly into contact with the bottom wall of the guidepath, thereby locking the bracket in position, in the same manner heretofore alluded to above.

Associated with the clasp at the free edge thereof is a locking arm 346. The locking arm detachably engages a lip 348 formed on the wall 318, when the clasp is rotated to a horizontal position, in the known manner. Interconnecting or interengaging the arm and the lip maintains the clasp in a horizontal plane and, thus, the wedge in its locking mode. Disengagement of the lip and arm coupled with rotation of the clasp toward a vertical plane causes the wedge to withdraw from its locking mode to enable the bracket to slid in a track formed in a slat.

Although not shown in the drawing, it is to be understood that a plurality of recesses or depressions can be formed in the bottom wall of the guidepath of the track along the extent thereof. Each recess would be dimensioned to nest or accomodate the wedge or a portion thereof therewithin. The downward motion of the wedge would be expanded to project the wedge into any desired recess. Since the recesses would be formed below the plane of the bottom wall, a more positive locking of the bracket would be effectuated.

Figure 9:
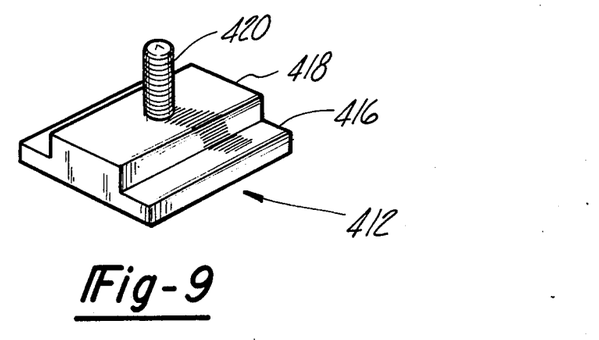
FIG. 9 is a perspective view of an alternate embodiment of a bracket associated wedge member.
Figure 10:
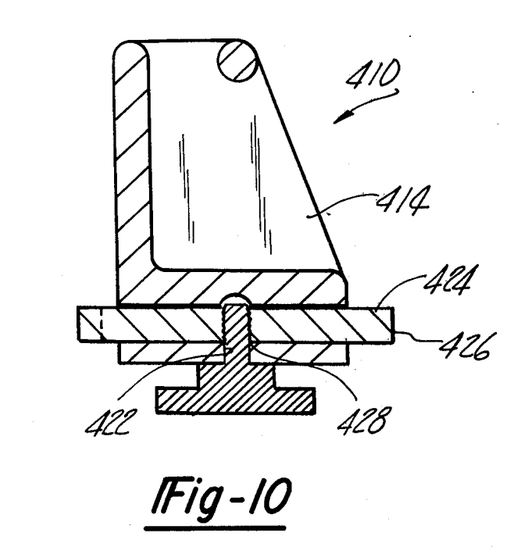
FIG. 10 is a cross-sectional view of an alternate embodiment of the bracket hereof incorporating the wedge member of FIG. 9.

Referring now to FIGS. 9 and 10, there is illustrated therein a further embodiment of the present invention, generally, denoted at 410. In accordance with this embodiment, the means for releasably locking the bracket in position is simplified. As contemplated herein, the bracket 410 comprises a base section 412 and an upper section 414. The base section 412 includes a lower portion 416 adapted to be disposed in a guidepath in the same manner hertofore described. A shank portion 418 is integrally formed with the lower portion 416, as shown. Disposed centrally of the shank portion and projecting upwardly therefrom is a threaded shaft 420. The shaft 420 projects through a bore 422 formed in the upper section 414. The bore 422 registers with a lateral slot 424 formed in the upper section, again, in the same manner heretofore described. A rotatable disc 426 having a central threaded aperture 428 is disposed in the slot and threadably engages the shaft 420.

The configuration of the remainder of the upper section can adopt either of the article retainer-receiving means described hereinabove with or without the cross-strap mounting member.

It is to be readily appreciated that the means for locking is directly incorporated into the base section hereof. Thus as the disc is rotated in a first direction, the lower portion 416 is urged into engagement with the bottom wall of the guidepath thereby locking the bracket in position. Rotation of the disc in the opposite direction withdraws the lower portion from its engagement with the guidepath bottom wall.

It is to be further appreciated that the biasing arrangement described with reference to FIGS. 7 and 8 hereof could be deployed herein in lieu of the threaded shaft and disc arrangement.

It should be readily understood that movement of the bracket along the track will vary the tension of a strap threaded therethrough and secured to an article to be transported, such as a bicycle or the like.

It is to be appreciated that there has been described herein a tie-down bracket for an article carrier that can be readily locked in any desired position in a track formed in a slat.

Having, thus, described the invention, what is claimed is:

1. A tie-down bracket for an automotive vehicle mounted article carrier having at least one slat affixed to the vehicle, the improvement comprising:
   (a) a base section engageable with the slat;
   (b) an upper section for facilitating securement of articles carried on the carrier;
   (c) the upper section being interconnected to the base section,
   (d) means for releasably locking the bracket in a preselected position along the length of a track formed in the slat and comprising a member which is urgeable into engagement with a base formed in the track.

2. The bracket of claim 1 which further comprises:
a cross-strap mounting member disposed on the upper section.

3. The bracket of claim 1 wherein:
the upper section is provided with a first opening therethrough, the opening defining the means for receiving the strap, the strap being threadable through the first opening.

4. The bracket of claim 1 wherein the releasable locking means comprises:
   (a) wedge member,
   (b) a threaded shaft integrally formed with the wedge member and projecting upwardly therefrom, the shaft extending through a bore formed in the base, the bore being in registry with a slot formed in the upper section,
   (c) a disc disposed in the slot and threadably interconnected to the shaft, and
   wherein rotation of the disc in a first direction urges the wedge into locking engagement with a wall of the track and rotation of the disc in a second direction opposite to that of the first direction withdraws the wedge member from locking engagement.

5. The bracket of claim 4 wherein the base is provided with a recess in registry with the bore, the wedge member being nestable within the recess when the disc is rotated in the second direction.

6. The bracket of claim 1 wherein the releasble locking means comprises:
(a) a wedge member engageable with a track wall, (b) means for normally biassing the wedge member away from the track, the biassing means being connected to the wedge member and housed within a bore formed in the lower section,
(c) a rotatable clasp pivotally connected to the upper section and engageable with the wedge member, and
wherein rotation of the clasp in a first direction into contact with the wedge member urges the wedge member against the normal bias of the biassing means and into locking contact with the track wall.

7. The bracket of claim 1 which further comprises:
(a) a shaft integrally formed with the base section and projecting upwardly therefrom,
(b) the upper section includes a bore formed therein and a slot in registry with the bore, the shaft extending through the bore,
(c) a disc disposed in the slot and threadably interconnected to the shaft, and
the disc and the shaft cooperating to define the means for releasably locking, and wherein rotation of the disc in a first direction urges the base section into engagement with the track wall to lock the bracket in position and rotation of the disc in a second direction opposite to the first direction withdraws the base section from engagement with the track wall.

8. In combination with an article carrier for an automotive vehicle of the type comprising an elongated slat adapted to be affixed to the vehicle exterior the slat having a longitudinally extending track formed therein, a tie-down bracket therefor, the bracket comprising:
(a) a base section engageable with the track formed in the slat, the base being slidable along the extent of the track,
an upper section for facilating securement of articles carried on the carrier
(b) the upper section being interconnected to the base section and disposed above the slat,
(d) means for releasably locking the bracket in a peselected position along the length of the track and comprising a member which is urgeable into engagement with a base formed in the track.

9. The combination of claim 8 which further comprises:
a cross-strap mounting member disposed on the upper section.

10. The combination of claim 8 wherein:
the upper section is provided with a first opening therethrough, the opening defining the means for receiving the strap, the strap being threadable through the first opening.

11. The combination of claim 8 wherein the releasable locking means comprises:
(a) a wedge member,
(b) a threaded shaft integrally formed with the wedge member and projecting upwardly therefrom, the shaft extending through a bore formed in the base, the bore being in registry with a slot formed in the upper section,
(c) a disc disposed in the slot and threadably interconnected to the shaft, and
wherein rotation of the disc in a first direction urges the wedge into locking engagement with a wall of the track and rotation of the disc in a second direction opposite to that of the first direction withdraws the wedge member from locking engagement.

12. The combination of claim 11 wherein:
the base is provided with a recess in registry with the bore, the wedge member being nestable within the recess when the disc is rotated in the second direction.

13. The combination of claim 8 wherein the releasable locking means comprises:
(a) a wedge member engageable with a track wall,
(b) means for normally biassing the wedge member away from the track, the biassing means being connected to the wedge member and housed within a bore formed in the lower section,
(c) a rotatable clasp pivotally connected the upper section and engageable with the wedge member, and
wherein rotation of the clasp in a first direction into contact with the wedge member urges the wedge member against the normal bias of the biassing means and into locking contact with the track wall.

14. The combination of claim 8 which further comprises:
(a) a shaft integrally formed with the base section and projecting upwardly therefrom,
(b) the upper section includes a bore formed therein and a slot in registry with the bore, the shaft extending through the bore,
(c) a disc disposed in the slot and threadably interconnected to the shaft, and
the disc and the shaft cooperating to define the means for releasably locking, and wherein rotation of the disc in a first direction urges the base section into engagement with the track wall to lock the bracket in position and rotation of the disc in a second direction opposite to the first direction withdraws the base section from engagement with the track wall.

15. The combination of claim 8 which further comprises:
a stop associated with track for limiting the extent of travel of the bracket along the track.

16. The combination of claim 8 wherein the track has a substantially inverted T-shape configuration.

17. The combination of claim 8 wherein a slat comprises:
a substantially solid body having an upper surface and a lower surface, the upper surface having a longitudinally extending slot formed therein, the slot being in registry with a guidepath formed in the body, the guidepath being defined by (a) a bottom wall formed in the body, (b) a pair of opposed parallel sidewalls formed in the body, (c) a pair of opposed inwardly extending shoulders integrally formed with the sidewalls, the junction between the guidepath and the slot being defined by the shoulders.

18. The combination of claim 8 which further comprises:
(a) a pair of spaced apart parallel slats,
(b) a tie-down bracket associated with each slat, (c) a cross-strap extending between the brackets, the ends of the strap being connected to the associated bracket, and wherein the cross-strap is movably positionable in response to movement of the bracket.

19. A tie-down bracket for an article carrier, comprising:
(a) a base section engageable with a track formed in the carrier,
(b) an upper section interconnected to the base section, and
(c) means for releasably locking the bracket in a preselected position along the length of a track formed in the carrier, the means comprising:
(1) a wedge member,
(2) a threaded shaft integrally formed with the wedge member and projecting upwardly therefrom, the shaft extending through a bore formed in the base, the bore being in registry with a slot formed in the upper section,
(3) a disc disposed in the slot and threadably interconnected to the shaft, and wherein rotation of the disc in a first direction urges the wedge into locking engagement with a wall of the track and retation of the disc in a second direction opposite to that of the first direction withdraws the wedge member from locking engagement.

* * * * *

UNITED STATES PATENT AND TRADEMARK OFFICE
CERTIFICATE OF CORRECTION

PATENT NO. : 4,132,335
DATED : January 2, 1979
INVENTOR(S) : Charles E. Ingram

It is certified that error appears in the above-identified patent and that said Letters Patent are hereby corrected as shown below:

Column 2, line 33, second occurrence of "the" should be --a--;

Column 3, line 47, following "first occurrence of "slats","4" should be --14--;

Column 4, line 22, preceding "positioning", "justably" should be --adjustably--;

Column 4, line 44, following "58", "s" should be --is--;

Column 5, line 15, following "opening", "2" should be --72--;

Column 8, line 11, following "thus", there should be a comma;

UNITED STATES PATENT AND TRADEMARK OFFICE
CERTIFICATE OF CORRECTION

PATENT NO. : 4,132,335
DATED : January 2, 1979
INVENTOR(S) : Charles E. Ingram

It is certified that error appears in the above-identified patent and that said Letters Patent are hereby corrected as shown below:

Column 9, line 5, preceding "lock-", "releasble" should be --releasable--;

Column 10, line 21, following "connected" add --to--; and

Column 12, line 11, following "and", "retation" should be --rotation--.

*Signed and Sealed this*

*Twenty-ninth* Day of *May 1979*

[SEAL]

Attest:

RUTH C. MASON
Attesting Officer

DONALD W. BANNER
Commissioner of Patents and Trademarks